Figure 1:
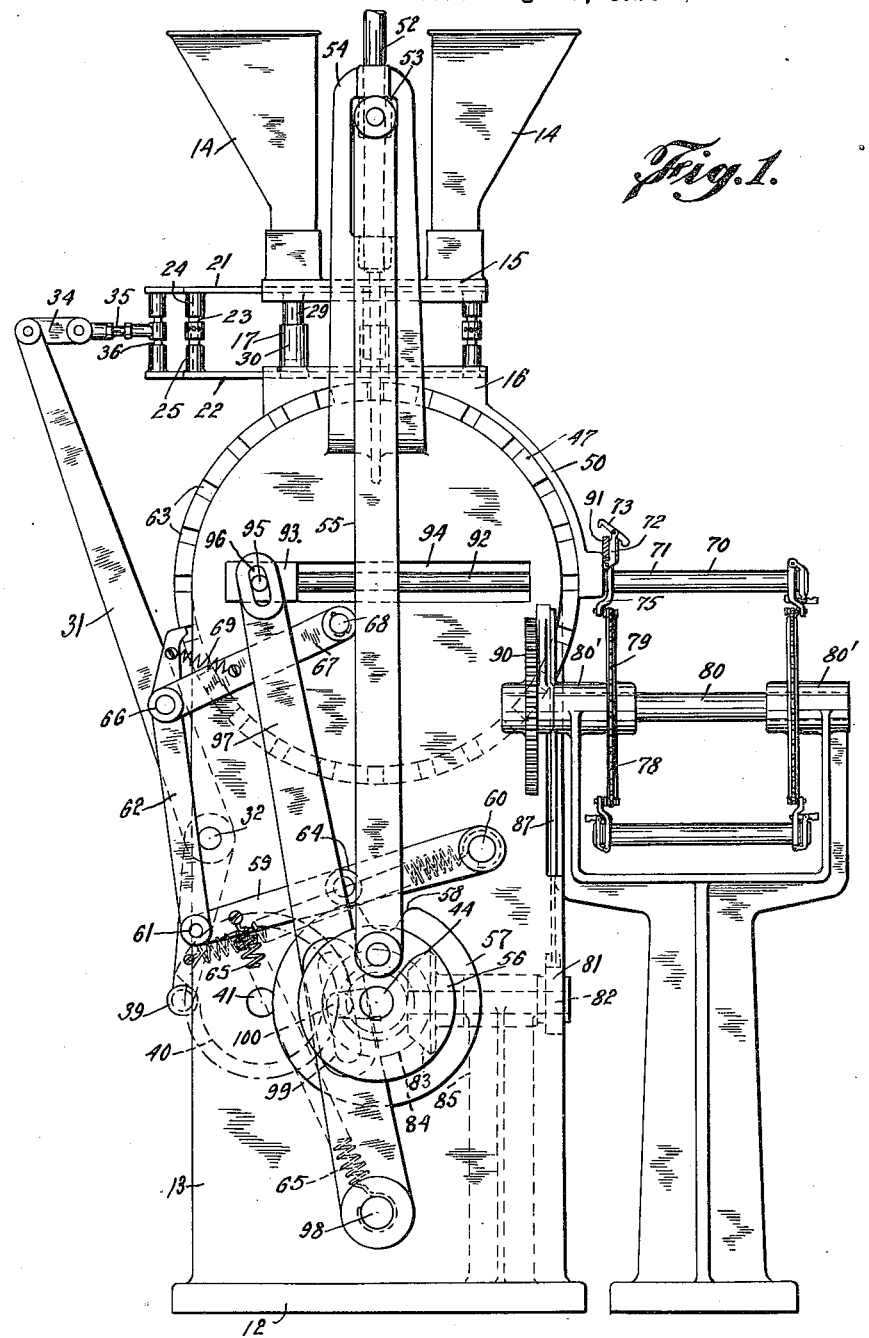

July 7, 1925.

M. MARSA 1,545,266

PROCESS OF AND APPARATUS FOR MAKING CORK ARTICLES

Filed Aug. 15, 1924     8 Sheets-Sheet 1

INVENTOR
M. Marsa
BY
Sigmund Herzog
ATTORNEY

July 7, 1925. 1,545,266
M. MARSA
PROCESS OF AND APPARATUS FOR MAKING CORK ARTICLES
Filed Aug. 15, 1924   8 Sheets-Sheet 8

INVENTOR
M. Marsa
BY
Sigmund Herzog
ATTORNEY

Patented July 7, 1925.

1,545,266

UNITED STATES PATENT OFFICE.

MELCHOR MARSA, OF BROOKLYN, NEW YORK, ASSIGNOR TO INTERNATIONAL CORK COMPANY, OF BROOKLYN, NEW YORK, A CORPORATION OF NEW YORK.

PROCESS OF AND APPARATUS FOR MAKING CORK ARTICLES.

Application filed August 15, 1924. Serial No. 732,246.

*To all whom it may concern:*

Be it known that I, MELCHOR MARSA, a citizen of the United States, and resident of Brooklyn, in the county of Kings and State of New York, have invented certain new and useful Improvements in a Process of and Apparatus for Making Cork Articles, of which the following is a specification.

The present invention relates to a process and apparatus for manufacturing articles of comminuted or granulated cork. It pertains more particularly to a process of and apparatus for forming rods especially adapted for use in producing what is known in the trade as composition cork articles, such as, for instance, cork disks or other sealing devices used in the bottling or analogous arts, although such rods may be used for various other purposes.

In forming cork rods of the type mentioned, the granulated cork is mixed with a suitable binding agent, which is adapted to coagulate and unite the particles of cork when subjected to a proper degree of heat and pressure, and when cool becomes insoluble and practically unaffected by any degree of heat to which the finished article may be subjected without being destroyed or consumed. The comminuted cork prepared as stated is usually packed into a confining tube or mold, the filled or packed tube being heated in an oven to the desired degree, the rod so obtained being then removed from the mold and severed into sections of the desired length or thickness to form bottle cap sealing disks, gaskets, packing rings, etc.

In order to permit the filled tubes or molds to be heated so as to coagulate the binding agent immediately after the granulated cork is packed into the said tubes or molds, that is to say without being removed from the packing machine, the tubes or molds must extend horizontally or nearly horizontally. In practice it has been found that, when these tubes or molds are filled with the granulated cork in horizontal positions, an uneven product is obtained, the rods being denser longitudinally at one side thereof than at their other sides. The reason for this is that, as the material is fed into a tube or mold, the finer granules find their way between the coarser granules to the bottom of the feeding device. When a charge is thus fed and packed into a horizontal tube or mold, the granules being unevenly divided, the product obtained, that is to say the rod, will be denser along a longitudinal line adjacent the bottom of the feeding device than at a longitudinal line adjacent the top of said feeding device.

The main object of the present invention is to overcome the difficulties mentioned, that is to say to provide an improved process and apparatus for uniting the particles of cork by the coagulation of the binding agent, whereby the density of the product obtained is even throughout the length and also throughout the transverse cross-sectional areas thereof.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

Generally speaking the improved process and apparatus consists of a series of steps and devices, respectively, whereby the comminuted cork, having the binder incorporated therein, is fed in successive increments into a tube or mold, it being compressed in the latter, to be heated after compression. The successive increments or charges are initially partly packed or compressed in vertically extending auxiliary molds and are then transferred to and subjected to final compression in main or final molds.

In carrying the process into practice, it is preferred to employ a plurality of molds, fed from a common hopper, and also a plurality of compressing devices which are operated simultaneously, to obtain economy and increased output.

Two of the many possible embodiments of the machine, with which the present process is put in practice, are illustrated in the accompanying drawings, in which:—

Figure 2:
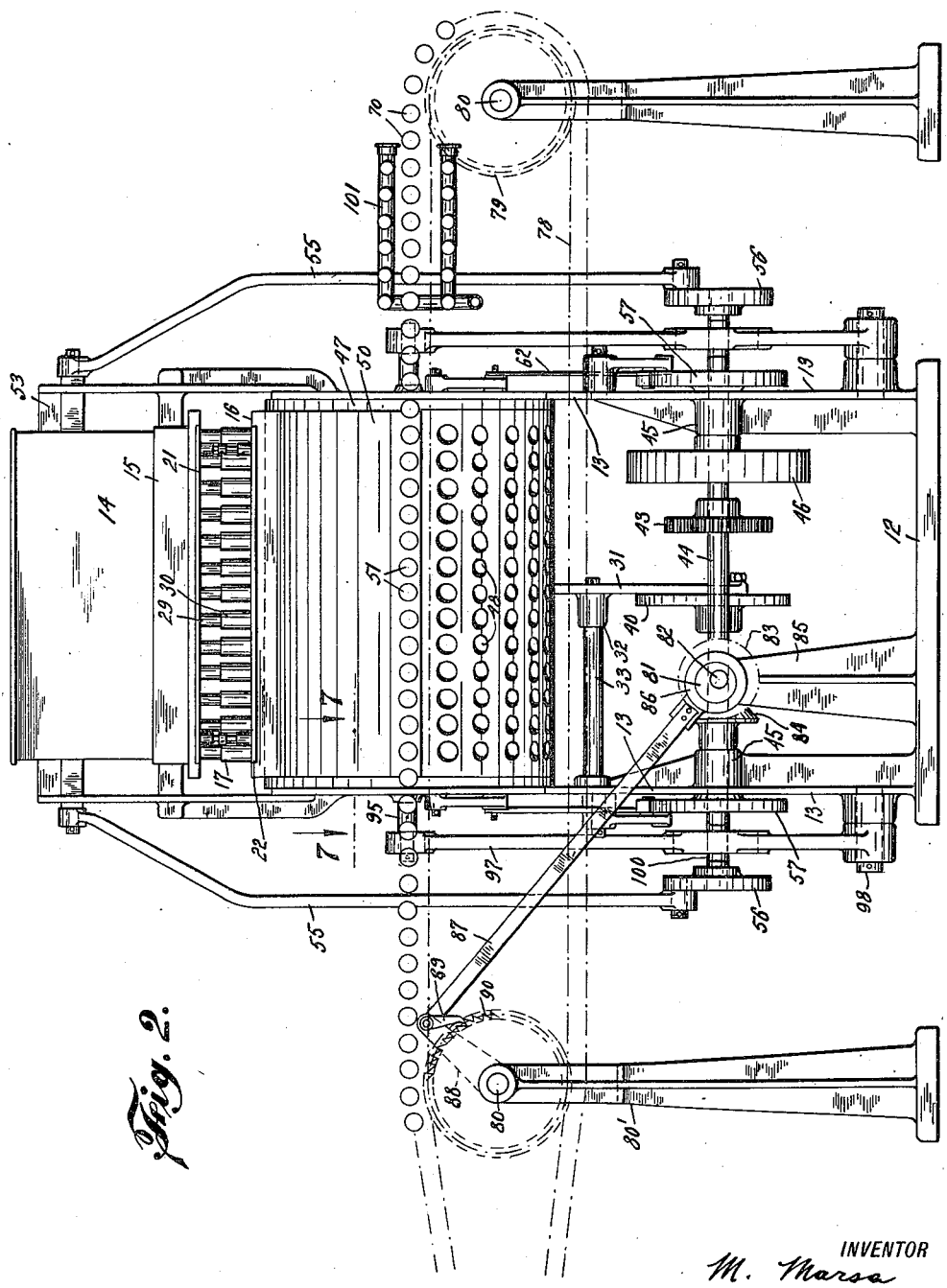
Figure 3:
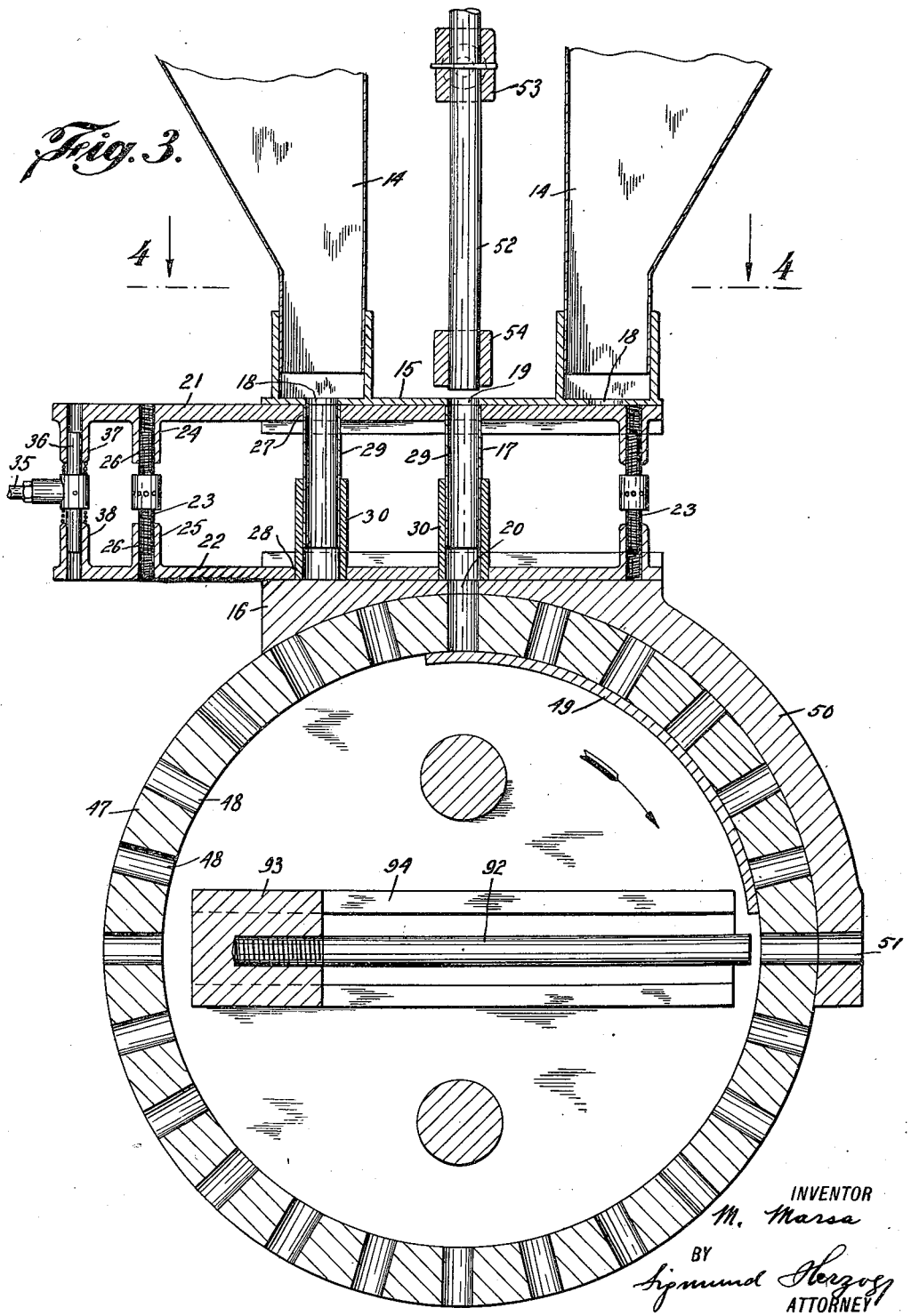
Figure 4:
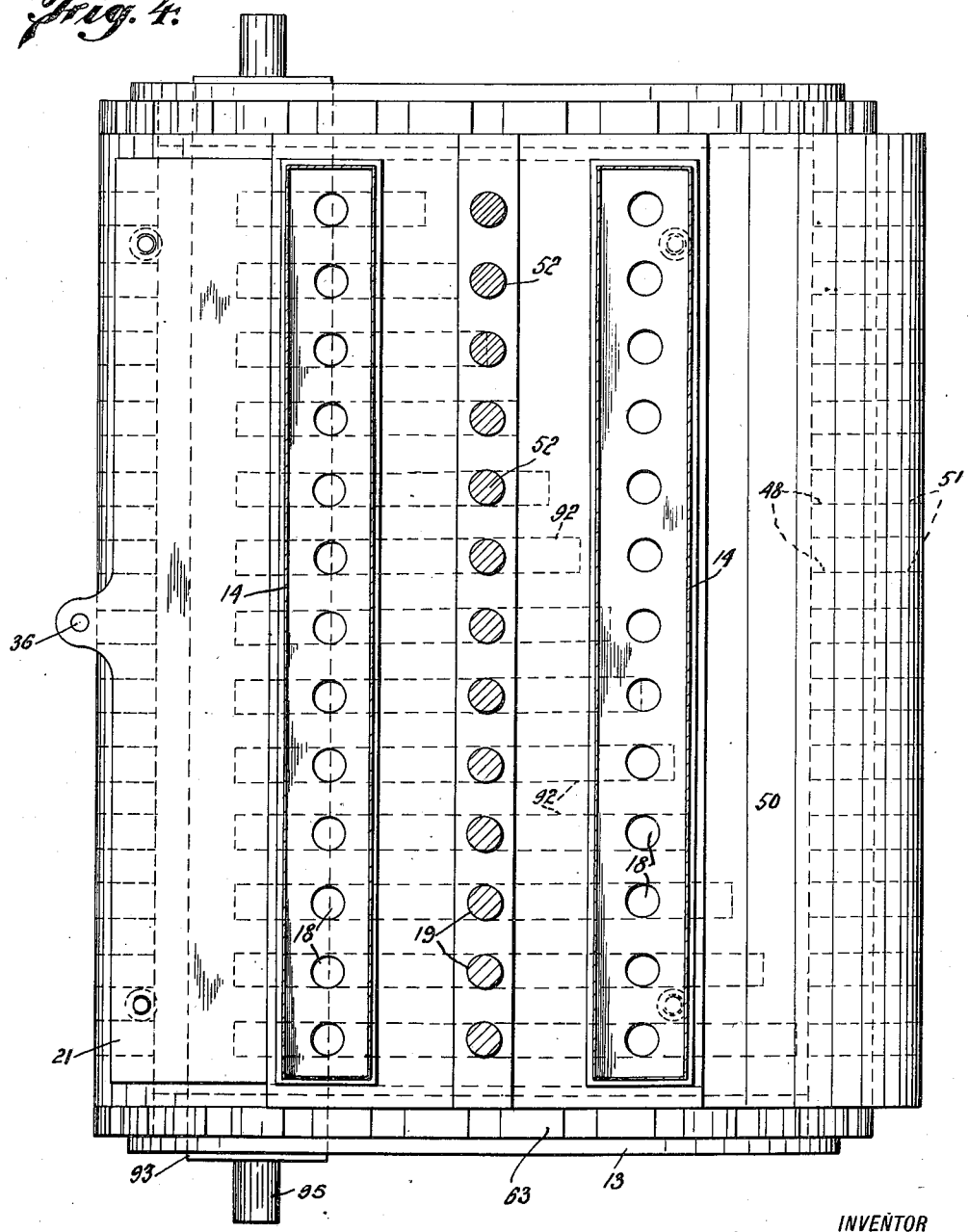
Figure 5:
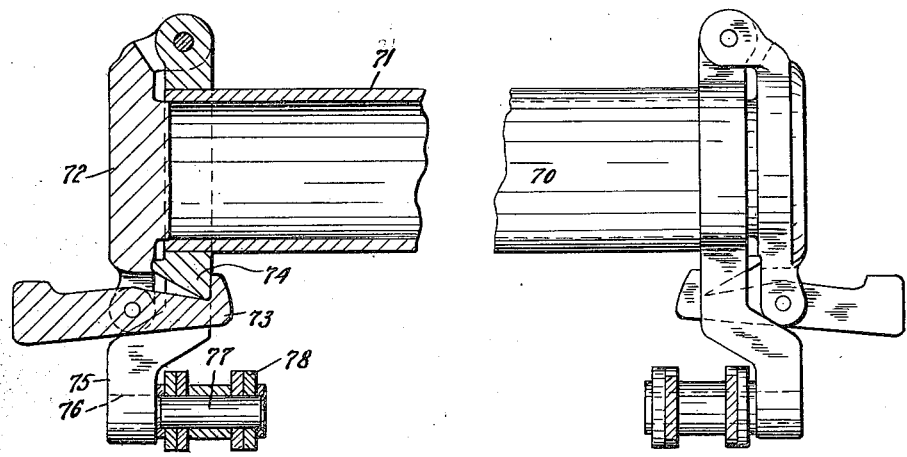
Figure 6:
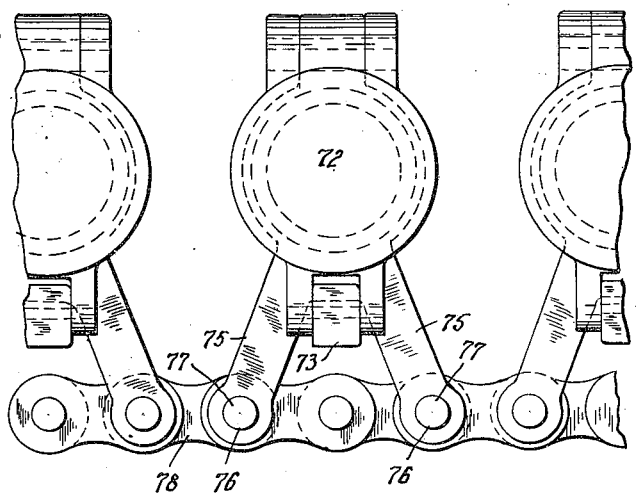
Figure 7:
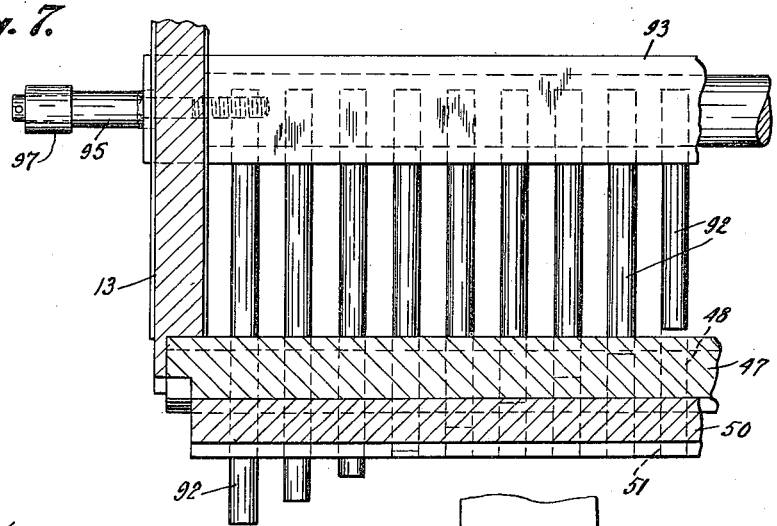
Figure 8:
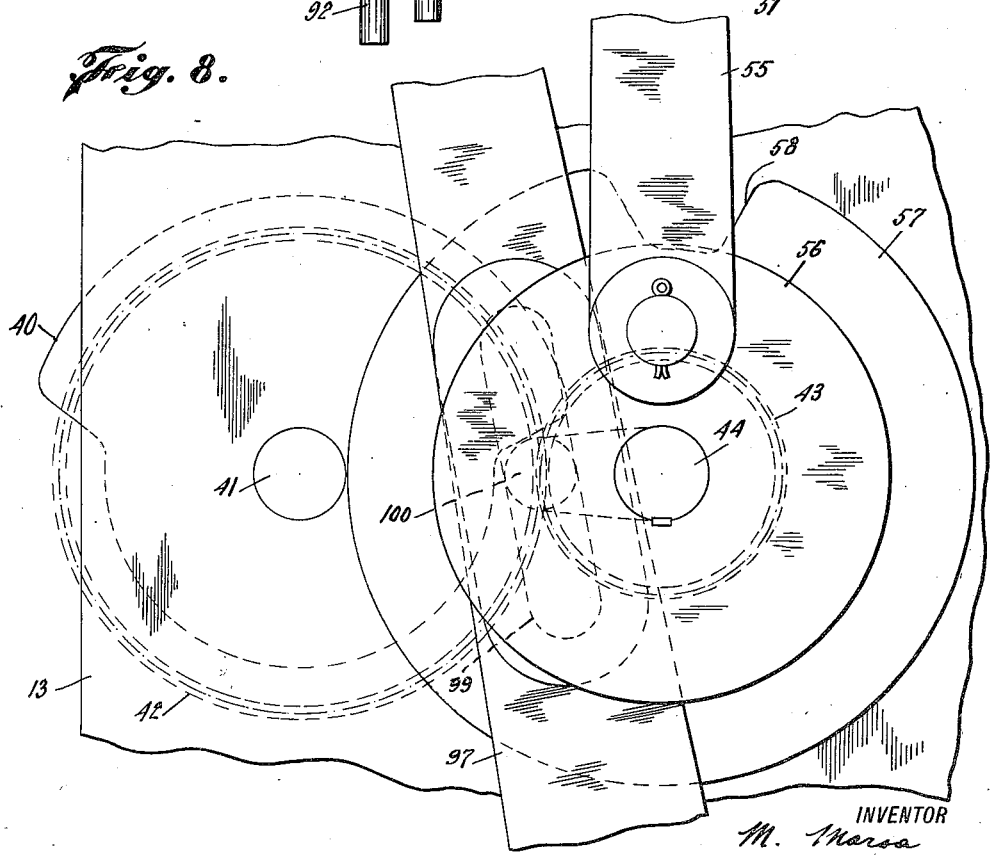
Figure 9:
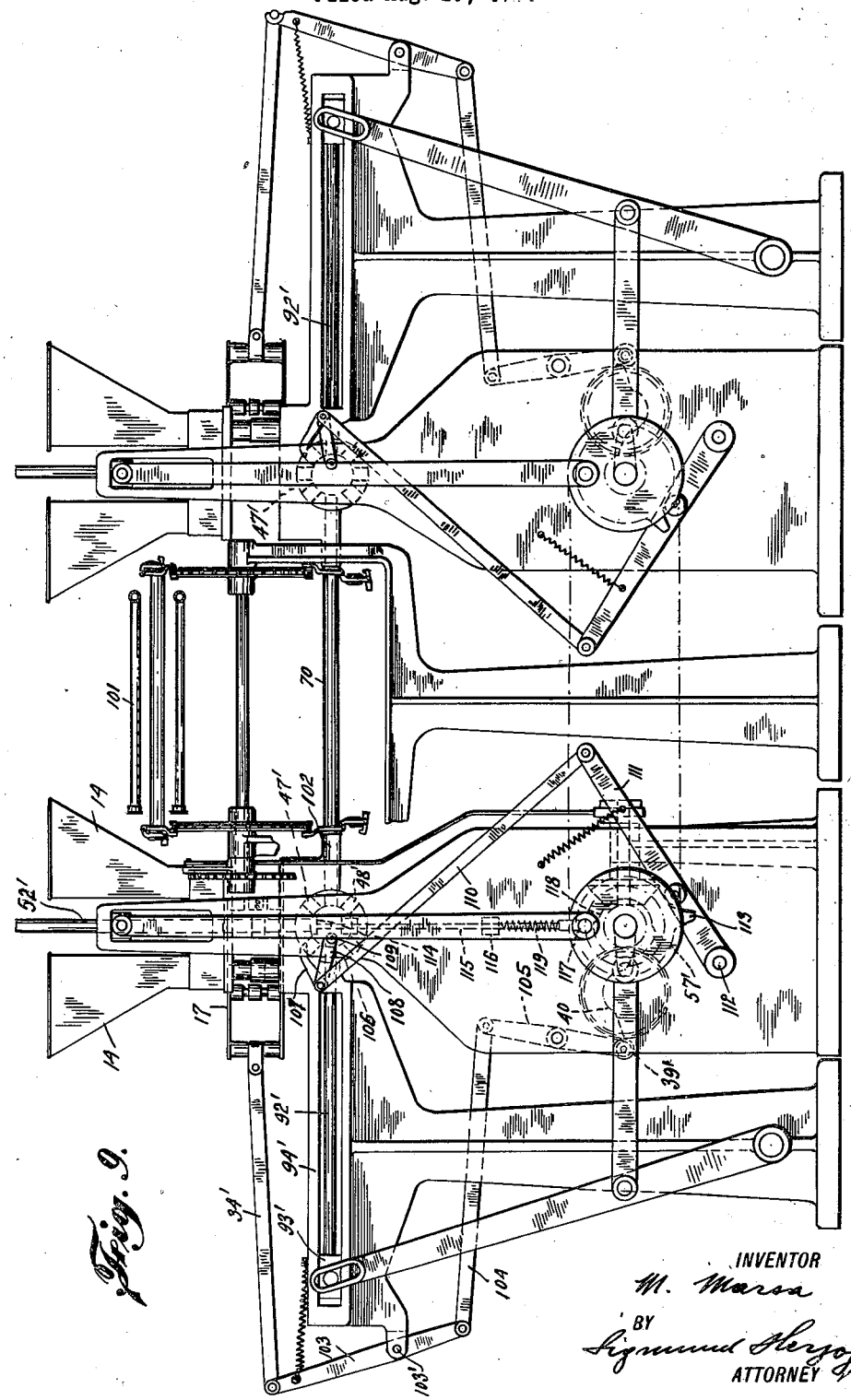
Figure 10:
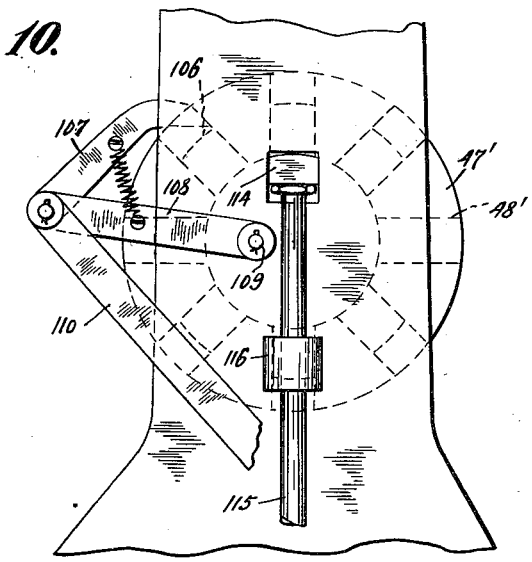
Figure 11:
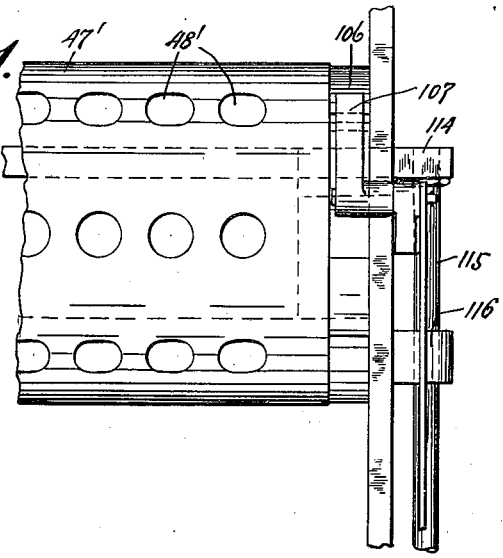

Figure 1 is a front elevation of the improved machine; Fig. 2 is a side elevation thereof; Fig. 3 is a vertical transverse section taken through the hopper and auxiliary molds of the machine, on a larger scale; Fig. 4 is a section taken on line 4—4 of Fig. 3; Fig. 5 is a front elevation, partly in section, of one of the main molds, on a larger scale; Fig. 6 is a side elevation of a plurality of these molds; Fig. 7 is a section taken on line 7—7 of Fig. 2, on a larger scale; Fig. 8 is a front elevation, on a larger scale, of a plurality of actuating devices of some of the moving elements of the machine; Fig. 9 is a front elevation of a modified machine; Fig. 10 is a similar elevation, on a larger scale, of one of the auxiliary molds employed in the device shown in Fig. 9; and Fig. 11 is a side elevation of the detail shown in Fig. 10.

In the preferred embodiment of the machine, a plurality of molds is carried past a plurality of compressing means, in the form of plungers, which are adapted to individually enter said molds, said plungers being successively of decreasing length or have individually decreasing extent of movement in the individual molds to compensate for the gradually increasing amounts of material within the traveling molds. In this manner at each compression stroke of the plungers, one of the molds is completely filled and packed ready to be heated for the purpose above referred to.

Referring now first to Figs. 1 to 8, inclusive, of the drawings, the numeral 12 indicates a base, from which rise two frame members 13, on which are mounted two hoppers 14, into which the properly treated comminuted cork is placed. The hoppers are placed side by side and provided with a bottom 15, that is slidable vertically in relation to the said hoppers, for a purpose hereinafter to be described. Suitably spaced from the bottom 15 is provided a table 16, which connects the frame members 13, and between the said bottom and the said table is arranged a measuring device 17, which will be presently described in detail. In the bottom 15 are provided two rows of apertures 18, constituting outlets of the two hoppers, a row of apertures 19 being formed in the bottom 15 between the rows 18, as clearly appears from Figs. 3 and 4 of the drawings. In alignment with the row of apertures 19 is provided in the table 16 a row of apertures 20. The measuring device comprises two plate members 21 and 22, the distance between which may be adjusted, for a purpose hereinafter to be described, by any suitable means. In the case illustrated in the drawings, the adjusting means comprises a plurality of screw bolts 23, the threads of which engage with those in the bores 26 of bosses 24 and 25 on the plate members 21 and 22, respectively. Those portions of the screw bolts which engage with the bosses 24 are threaded in opposite directions to those engaged with the bosses 25. When, therefore, the screw bolts 23 are turned, the plate members 21 and 22 are caused to approach one another or to recede from one another, according to the direction of movement of the said bolts. In the plate member 21 are provided two rows of openings 27, registering with two rows of openings 28 in the plate-member 22. Into each opening in the plate member 21 is fitted a tube 29, adapted to telescope into a tube 30 in that opening 28 in the plate member 22 which is in alignment with the respective opening 27 in the plate member 21. The two sets of co-operating tubes are spaced apart a distance so that, when one set of these co-operating tubes register with one row of the apertures 18 in the hopper bottom 15, the other set of co-operating tubes is in alignment with the apertures 19 and 20 in the hopper bottom 15 and table 16, respectively.

The measuring device is reciprocably arranged between the hopper bottom 15 and table 16, the hopper bottom resting on the plate member 21 and moving upwards or downwards in relation to the hoppers 14 as the distance between the plate members 21 and 22 is increased or decreased for the purpose of varying the sizes of the individual measuring tube sets 29 and 30. The means for reciprcating the measuring device comprises, in the case illustrated in the drawings, a lever 31, pivoted at 32 to a boss 33 on one of the frame members 13. One end of this lever is connected by links 34 and 35 with a bolt 36, engaging bosses 37 and 38 on the plate members 21 and 22, respectively, and the other end of said lever carries an anti-friction roller 39, co-operating with a cam 40, the latter being fixed to a shaft 41. To this shaft is keyed a gear 42, meshing with a pinion 43 on the driving shaft 44 of the machine. This driving shaft is journaled in bearings 45 on the frame members 13 and has fixed to it a pulley 46, driven by the intermediary of a belt, not shown, from any suitable source of power. The ratio of the gear 42 and the pinion 43 is two to one, for a purpose which will hereinafter appear.

The granulated cork is transferred by means hereinafter to be described from the measuring tubes into an auxiliary mold 47, in the form of a drum, the axis of which extends horizontally. This drum is rotatably mounted in the frame members 13 and is provided with longitudinal rows of radial apertures 48, the members of each row corresponding in number to that of the apertures 20 in the table 16. Obviously, the number of the apertures 20 corresponds to that of one set of co-operating measuring tubes 29 and 30. Within the drum 47 is disposed a stationary curved plate 49, the same abutting against the inner face of the said drum and extending from adjacent the apertures 20 downwards through an angular distance of approximately 90°. In a similar manner is disposed outside of the drum a curved plate member 50, which is, preferably made integral with the table 16 and extends downwards through an angular distance of approximately 90°. The plate member 50 is provided with a row of horizontally extending apertures 51, with which are adapted to register the radial apertures 48 in the drum 47. The drum is moved step by step by means hereinafter to be described. During each period of rest of the drum, one of the rows of apertures 48 registers with the apertures 20 in the table 16 and another row of apertures 48 with the apertures 51 in the plate member 50. When the drum is at rest, a set of co-operating measuring tubes 29 and 30, which has been previously filled, is in alignment with the apertures 20 in the table 16, a series of plungers 52, carried by a cross head 53, moving downwards, thereby transferring material from the filled measuring tubes into the apertures 48 in alignment therewith and partly compressing the same in the said last-mentioned apertures. The plungers 52 move in guides 54, and are actuated from the main driving shaft 44, for instance, by connecting rods 55. One end of each of these connecting rods is in engagement with the cross-head 53, their other ends being joined to crank disks 56 on the shaft 44.

Intermittent movement is imparted to the drum 47 from the main driving shaft, the latter having keyed to it for this purpose, for instance, two disks 57, having each a notch 58. With each disk 57 co-operates a lever 59, fulcrumed at one of its ends, at 60, to one of the frame members 13 and having pivoted at 61 to its other end a pawl 62 adapted to engage notches 63 in the drum. These notches are equidistantly spaced and correspond in number to that of a set of radial apertures 48 therein. Intermediate its ends, each lever 59 carries an anti-friction roller 64, co-operating with the respective disk 57. In order to hold this roller continuously in contact with the disk 57, a spring 65 is provided, one end of said spring being attached to the respective lever 59 and its other end to a stationary part of the machine. Each pawl has pivoted to it, intermediate its ends, at 66 a link 67, the other end of which is fulcrumed at 68 to a stationary part of the machine. A spring 69 connects each pawl with its link 67.

The cam 40, crank disks 56 and notched disks 57 are so timed that, when the measuring device and the auxiliary molds are at rest, the plungers 52 move on their downward strokes, thereby transferring the material from the measuring tubes in alignment with the said plungers into the auxiliary mold and compressing the same partly therein. When the plungers, on their upward movement, have been disengaged from the auxiliary mold and the measuring tubes, the auxiliary mold is given a partial turn in the direction of the arrow shown in Fig. 3 of the drawings, thereby bringing the next row of apertures 48 into alignment with the plungers 52. Also, the measuring device is shifted laterally, to bring the second row of measuring tubes into register with the plungers and to shift the empty measuring tubes into register with the second hopper, to be filled while the other set of measuring tubes is emptied.

The partly compressed cork is packed into horizontally extending molds 70. These molds are in the present case each in the form of a tube 71, to each end of which is pivoted a cover 72. Each cover is provided with a locking device, for instance in the form of a pivoted latch 73, adapted to engage a projection 74 on the tube 71. At each of its ends, the tube 71 is provided with two spaced legs 75, each provided with an aperture 76, adapted to engage a pin 77 on an endless chain 78. There are two endless chains provided, running over sprocket wheels 79. These wheels are mounted on shafts 80, journaled in bearings 80', the arrangement being such that the tubes are carried step by step past the operatures 51 in the curved plate member 50. The means for causing the tubes to move intermittently in the manner stated comprises, for instance, an eccentric 81 on a shaft 82, which is driven from the main shaft 44. For this purpose, there is keyed to the shaft 82 a bevel gear 83, in mesh with a similar gear 84 on the shaft 44. The shaft 82 is mounted in bearings 85. The strap 86 of the eccentric is connected by a rod 87 with a link 88, the latter being oscillatably mounted upon one of the sprocket wheel shafts 80. A pawl 89 on the link 88 cooperates with a ratchet wheel 90 on the last-mentioned shaft 80. The eccentric is keyed to the shaft 82 in such a manner that the ratchet wheel 90 is given a partial turn, to advance the molds 70 at the time that the drum 47 is given a partial turn, the molds 70 being kept stationary in alignment with the apertures 51 in the curved plate member 50 during the time that cork is being partially compressed in the auxiliary mold 47. The molds 70 are obviously spaced on the endless chains 78 in the same manner as the apertures 51 are spaced.

The molds 70 are placed upon the endless chains 78 with those ends, which are to pass the auxiliary molds, uncovered. The covers 72 and the latches 73 thereon are swung manually into open positions and are held in these positions by a rail 91, dropping to closing positions as soon as they have passed that rail. The latches 73 are weighted, so that they engage automatically with the projections 74 on the tubes 71. The rail is of a length that the tubes are closed immediately after they have passed the auxiliary mold.

The partly compressed cork is transferred from the auxiliary mold 47 to the tubes 71 and compressed therein by a plurality of plungers 92. These plungers extend horizontally and are attached to a cross head 93, which moves in guides 94, said guides being formed on the frame members 13. The plungers are successively decreasing in length in the direction of movement of the tubes 71, (see Figs. 4 and 7), and, therefore, are adapted in succession to compress a successively greater amount of material in a tube as the same is intermittently caused to move past each plunger. The operation of the machine is such that, after the tube is brought into alignment with the first opening 51 in the curved member 50, it receives a charge, consisting of the partly compressed cork in an aperture 48 in the auxiliary mold, and the same is compressed within the tube by the longest one of the plungers. The tube is then brought into register with the second plunger and a second charge is compressed in the tube, the operation continuing until the tube passes beyond the row of plungers, and, completely filled, is subjected to the heating means hereinafter to be described. The cross head 93 is provided at each of its ends with a pin 95, seated in a longitudinal slot 96 of a lever 97, that is fulcrumed at 98 to one of the frame members 13. Intermediate its ends, each lever is provided with a longitudinal slot 99, in engagement with a crank 100 on the shaft 44. The cranks are so timed in relation to the notched disks 57, that the plungers 92 are caused to move toward the tubes 71 and into the latter while the auxiliary mold is kept stationary.

After the tubes have been filled, they are heated. For this purpose gas burners 101 or any other suitable means may be provided, the binding material being thus coagulated.

The operation of this machine is as follows: The comminuted cork is delivered in measured quantities to the auxiliary mold and partly compressed therein by the plungers 52, the compressed charges being advanced step by step into alignment with the apertures 51 in the curved plate member 50 and transferred there from the auxiliary mold by the plungers 92 to the molds 70, in which they are subjected to final compression. The burners 101 do not extend throughout the length of the machine, so that the cork rods or columns are cooled before they are removed from the molds, thereby permanently maintaining their form.

The cork rods are severed into sections of desired length or thickness to form bottle cap sealing disks, packing disks, gaskets, etc. If desired, the rods before being severed or the severed sections thereof may be coated or treated to give increased water or gas resistant qualities.

It is obvious that, while herein specific means have been described for actuating the several elements of the machine, any other may be used without departing from the invention, which lies mainly in the provision of auxiliary molds coacting with the final molds, the arrangement being such that, while the said final molds are disposed horizontally, the cork is initially compressed in the auxiliary molds vertically. A product is thus obtained that is of the same density throughout its length in transverse cross-section.

The modification illustrated in Figs. 9 to 11, inclusive, differs from the one above described in that the comminuted cork is simultaneously fed into the molds at both ends thereof by two sets of plungers. The machine illustrated in Figs. 9 to 11, inclusive, contains thus practically a duplication of the parts of the machine above described with the exception of the mold carrier. In other words, the machine comprises two packing machines of the type above referred to, which obviously must be connected so as to work in unison. It will be observed from an examination of Figs. 9 to 11, inclusive, of the drawings that the modified form of the invention comprises two sets of hoppers 14, with each set co-operating a measuring device 17, and with each measuring device co-acting an auxiliary mold 47'. These auxiliary molds are considerably smaller in diameter than the one above referred to, the plungers 92', co-operating with the said auxiliary molds, being disposed outside of the same and working through registering apertures 48' in the said auxiliary molds, when the latter are at rest and in alignment with tubular guides 102 between the said auxiliary molds and the main molds 70. The plungers 92' move into the main molds from opposite sides thereof, thereby feeding successively predetermined quantities of comminuted material into opposite ends of the said main molds and applying tamping pressure thereto. Otherwise the operation of the machine is the same as of that described in connection with Figs. 1 to 9, inclusive, of the drawings. There are, however, structural details which differ from those of the machine above described. Namely, the measuring devices are connected each by a link 34' with a lever 103, fulcrumed at 103' to the machine frame and connected by a link 104 with a lever 105. Each of these levers carries an anti-friction roller 39', co-operating with a cam 40. The cross heads 93' of the plungers 92' move in guides 94', which are considerably longer than the guides of the machine above described. Furthermore, the auxiliary measuring devices are each provided with a ratchet 106, with which co-operates a pawl 107 on a link 108, that is pivoted at 109 to the machine frame. This link is connected by a bar 110 with a lever 111, the latter being fulcrumed at 112 to the machine frame. The lever 111 carries, intermediate its ends, an anti-friction roller 64, co-operating with a disk 57', having a nose 113. Through each of the auxiliary molds 47' extends longitudinally a bar 114, in alignment with the plungers 52, which initially compress the material in the auxiliary molds. This bar is mounted upon two spring pressed rods 115, which move in guides 116, and carry each at their lower ends an anti-friction roller 117, co-operating with a cam 118 on the shaft 44. When the plungers 52' move on their compression stroke, the cam 118 moves the bar 114 upwards against the inner face of the auxiliary mold, thus forming a bottom thereof to permit of a proper compression of the material therein. When the plungers 52' move on their upward stroke, the bar 114 is caused to move downwards by springs 119, so as to prevent friction between the said bar and the auxiliary mold, when the latter is moved to bring the next series of apertures therein into alignment with the plungers 52'.

Otherwise the construction and operation of the machine is the same as of those described in connection with Figs. 1 to 9, inclusive, of the drawings.

What I claim is:—

1. The process of packing comminuted cork into molds which consists in first, feeding predetermined increments of cork into an auxiliary mold and individually partly compressing the same therein, and second, transferring the partly compressed increments in succession into a final mold and applying in succession final pressure thereto.

2. The process of packing comminuted cork into molds which consists in, first, feeding predetermined increments of cork into an auxiliary mold and individually partly compressing the same vertically therein, and, second, transferring the partly compressed increments in succession into a final mold and applying in succession horizontally final pressure thereto.

3. The process of packing comminuted cork into molds which consists in, first, partly compressing in succession predetermined increments of cork in an auxiliary mold, transferring the partly compressed increments in succession into a final mold, and third, applying final pressure to each increment in said final mold.

4. The process of packing comminuted cork into molds which consists in, first, feeding predetermined increments of cork into an auxiliary mold and individually partly compressing the same therein, second, transferring the partly compressed increments in succession into a final mold and applying final pressure thereto after the transfer of each partly compressed increment.

5. The process of packing comminuted cork into molds which consists in, first, feeding predetermined increments of cork into an auxiliary mold and individually partly compressing the same vertically therein, and, second, transferring the partly compressed increments in succession into a final mold and applying horizontally final pressure thereto after the transfer of each partly compressed increment.

6. An apparatus for packing comminuted material in a mold, comprising a plurality of auxiliary molds, means for feeding a predetermined quantity of comminuted material into each of said auxiliary molds and partly compressing the same therein, a final mold, and means for transferring in succession the partly compressed charges from said auxiliary molds into said final mold and applying final pressure in said final mold individually to said transferred partly compressed charges.

7. An apparatus for packing comminuted material in a mold, comprising a plurality of auxiliary molds, means for feeding a predetermined quantity of comminuted material into each of said auxiliary molds and partly compressing the same vertically therein, a final mold, and means for transferring in succession the partly compressed charges from said auxiliary molds into said final mold and applying final pressure in said final mold horizontally and individually to each of the partly compressed charges.

8. An apparatus for packing comminuted material in a mold, comprising a plurality of auxiliary molds, a plunger adapted to enter said auxiliary molds to partly compress the material therein, a final mold, and a second plunger for transferring in succession the partly compressed charges from said auxiliary molds into said final mold and applying final pressure in said final mold individually to said transferred partly compressed charges.

9. An apparatus for packing comminuted material in a mold, comprising a plurality of auxiliary molds, a vertically reciprocable plunger adapted to enter said auxiliary molds to compress the material therein, a final mold, and a second horizontally extending plunger for transferring in succession the partly compressed charges from said auxiliary molds into said final mold and applying final pressure in said final mold individually to said transferred partly compressed charges.

10. An apparatus for packing comminuted material in a mold, comprising a plurality of auxiliary molds, a vertically reciprocable plunger adapted to enter said auxiliary molds to partly compress the material therein, a horizontally extending tubular mold, and a plunger for transferring in succession the partly compressed charges from said auxiliary molds into said tubular mold and applying final pressure in said tubular mold individually to said transferred partly compressed charges.

11. An apparatus for packing comminuted material into a mold, comprising a plurality of rows of intermittently moving auxiliary molds, means for feeding a predetermined quantity of comminuted material at a time into a row of said auxiliary molds and partly compressing the same vertically therein, a plurality of final molds, means for moving said auxiliary molds so as to bring a row of filled molds into alignment with said final molds, and means for transferring the partly compressed charges from said auxiliary molds into said final molds and applying horizontally final pressure in said final molds individually to said transferred partly compressed charges.

12. An apparatus for packing comminuted material in a mold, comprising a plurality of rows of intermittently moving auxiliary molds, means for feeding a predetermined quantity of comminuted material at a time into a row of said auxiliary molds and partly compressing the same vertically therein, a plurality of horizontally extending tubular molds, means for moving said auxiliary molds so as to bring a row of filled molds into alignment with said tubular molds, and a plurality of plungers for transferring the partly compressed charges from said auxiliary molds into said tubular molds and applying final pressure in said tubular molds individually to said transferred partly compressed charges.

Signed at New York, in the county of New York, and State of New York, this 3rd day of July, A. D. 1924.

MELCHOR MARSA.